United States Patent Office
2,913,277
Patented Nov. 17, 1959

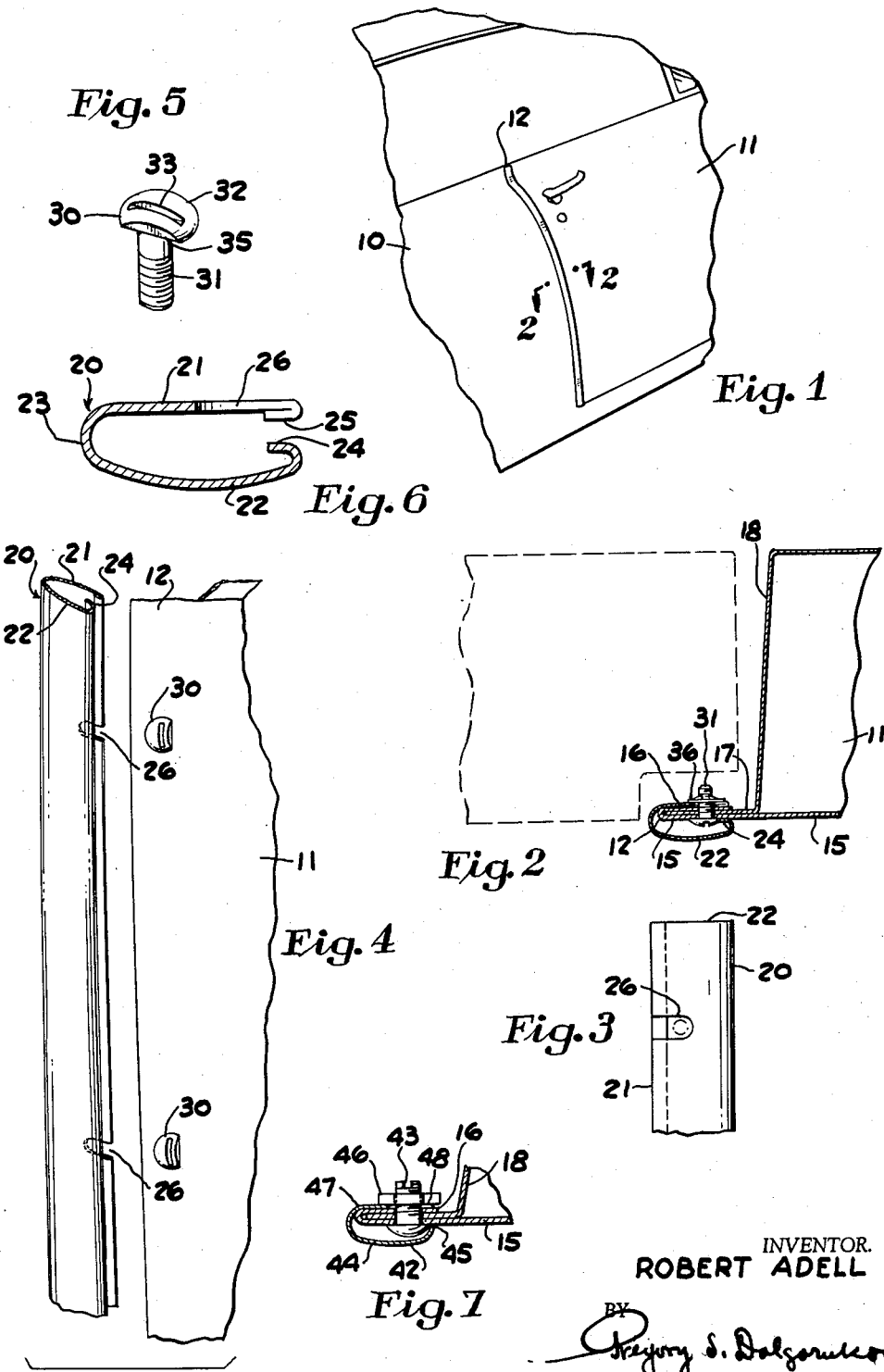

2,913,277

ORNAMENTAL AND EDGE PROTECTIVE MOLDING FOR AUTOMOBILE DOORS

Robert Adell, Detroit, Mich.

Application December 30, 1958, Serial No. 783,801

3 Claims. (Cl. 296—44)

This invention relates to motor vehicle bodies and more particularly to an improved ornamental and protective molding for the trailing edges of the doors of such bodies.

Provision of ornamental and protective molding on the trailing edges of motor vehicle doors, as disclosed in my prior patents, while being of great advantage and value, nevertheless present a number of serious problems. One of such problems results from the fact that ornamental moldings of the nature disclosed in my said patents and co-pending applications may be relatively narrow and may have width of only ¼". Yet, in spite of such width, the molding must embrace the trailing edge of the door and be retained in place thereon in a manner that would prevent its loosening and falling off due to the road rumble and shock produced by hard slamming of the doors in closing the same.

While numerous expedients have been offered for the purpose of connecting such molding to trailing edges in a desired manner, the intensive search for improving retaining means for such molding continues.

The efforts of those skilled in the art have been directed for a number of years toward providing improved retaining which do not interfere with the appearance of the molding and yet retain it in place in a reliable manner, preferably through positive connections. It has been proposed, for instance, to connect such molding to the trailing edge of automobile doors with the aid of screws passing through the trailing edge and one of the legs of the molding which is usually of a U-shape cross sectional configuration.

While such retaining means are of a positive nature, they possess a number of serious disadvantages interfering with their wider application. A threaded connector, such as a screw, is usually passed through the hole in the inner leg of the U of the molding and engages the trailing edge of the door either directly at a tapped hole, or through a nut. Thus, the head of the screw engages the inner leg, while the end of its shank projects through the skin sheet of the door and is covered by the outer leg of the molding. In order to provide for its engagement by a screw driver, such screw must have head slots of sufficient depth which, in turn, requires screw heads of adequate thickness. Such heads project inwardly for a substantial distance, which condition creates difficulties due to the tendency of such screws to loosen and fall out. It can be understood that as the screw loosens, it moves outwardly and its head already protruding for a considerable distance moves out still further and interferes with closing of the door. On the other hand, when lock washers are used under the heads of such screws to prevent their loosening, the heads of the screws project still further from the door edge. Providing screws having heads engaging the outer surface of the door was considered to be impractical since installation of moldings with such screws is most difficult, the heads of such screws being covered by the outer leg of the molding.

One of the objects of the present invention is to provide an improved ornamental and protective molding for trailing edges of automobile doors whereby the above difficulties and disadvantages are overcome and largely eliminated without introducing other problems or appreciably increasing the costs involved.

Another object of the present invention is to provide an improved molding of the above character which is secured to the trailing edge of an automobile door with the aid of screws, with the heads of such screws engaging the outer surface or skin sheet of the automobile body and yet providing for easy and secure application of the molding and of the screws, and concealing the heads of the screws from view.

A further object of the present invention is to provide an improved molding of the foregoing character, having improved retaining means including screws which are prevented from loosening by the molding itself.

A still futher object of the present invention is to provide an improved molding of the foregoing character which is simple and rugged in construction, is simple and easy to install and to replace, and is relatively inexpensive to manufacture.

Further objects and advantages of this invention will be apparent from the following description and appended claims, reference being had to the accompaying drawings forming a part of this specification, wherein like reference characters designate corresponding parts in the several views.

Fig. 1 is a perspective view showing a portion of an automobile body including a door provided with a molding embodying the present invention.

Fig. 2 is a fragmentary cross sectional view taken in the direction of the arrows on the section plane passing through the line 2—2 of Fig. 1.

Fig. 3 is a fragmentary elevational view taken on the inside leg of the molding, with the observer looking in the direction outwardly of the vehicle.

Fig. 4 is an exploded perspective view illustrating my improved molding just before its application to the trailing edge of the door with the screw connectors already installed on such edge.

Fig. 5 is a perspective view illustrating one of the screw connectors utilized in the illustrated embodiment of the invention.

Fig. 6 is a cross sectional view, on an enlarged scale, of the molding, said view taken through the middle of one of the slots provided in the inner leg of the molding.

Fig. 7 is a cross sectional view similar in part to Fig. 2 but showing a modified construction embodying the present invention.

It is to be understood that the invention is not limited in its application to the details of construction and arrangement of parts illustrated in the accompanying drawings, since the invention is capable of other embodiments and of being practiced or carried out in various ways. Also, it is to be understood that the phraseology and terminology employed herein is for the purpose of description and not of limitation.

In accordance with the invention I discard the former practice of connecting the molding to the trailing edge of the door with the aid of screws installed from the inner side of the door edge. I provide screw connectors which are installed from the outer side of the door edge and are passed through the trailing edge of the door prior to installation or application of the molding thereto. The inner leg of the molding is provided with screw slots by virtue of which expedient it can be slipped on the door edge to have the protruding shanks of the screws pass through such slots sidewise without interference with the application or installation of the molding. The heads of the screws are so constructed that in application of the molding to the door edge they climb over such heads and snap into engagement therewith when the molding approaches its proper position. Thereupon, the molding hooks on the head of the screw and thus not only retains itself in place positively but also prevents at the same time the screw from rotation and loosening.

In the drawing there is shown, by way of example an improved ornamental and protective molding embodying the present invention. Referring specifically to the drawings, the motor vehicle 10, a portion of which is shown in Fig. 1, is provided with a door 11 having a trailing edge 12 provided with ornamental and protective molding embodying the present invention. The door 11 includes a skin or outer sheet 15 bent upon itself as shown at 16 to embrace the flange 17 of an inner door sheet 18. Thus, the trailing edge 12 of the door 11 is made up of three thicknesses of the metal as indicated by the numerals 15, 16 and 17. The edge 12 may have longitudinal curvature in one or in two planes.

The ornamental and edge protective molding generally designated by the numeral 20 comprises a strip of sheet metal preferably of resilient character, such as stainless steel, bent to a generally U cross section having inner leg 21, an outer leg 22, and a generally rounded connecting portion 23. Along the free edge of the outer leg 22 there is provided a flange 24 bent inwardly of the U to form, in effect, a continuous hook extending along the free edge of the outer leg 22. Similarly, the free edge of the inner leg 21 may also be bent inwardly upon itself as indicated at 25. As is shown in the drawings, the flange 24 is open while the flange 25 may be compressed and closed as is best shown in Fig. 6. The outer surface of the molding may be polished or plated to impart to it a smooth and pleasing appearance and to prevent corrosion and rust.

Improved means are provided to retain the molding 20 on the trailing edge 12 of the door 11. In accordance with the present invention, the retaining means are of a positive nature and include threaded connections, such as screws. In accordance with the invention, the screws, one of which is shown separately in Fig. 5 and designated therein by the numeral 30, have shanks 31 passing through a plurality of holes drilled or punched in the trailing edge 12, and rounded heads 32.

An important feature of the present invention is that the screws 30 are passed through the trailing edge 12 not from the inner side, as in conventional structures, but from the outer side of the door and have their heads 32 covered by the outer leg 22 of the molding 20. In accordance with the invention, the heads 32 of the screws 30 are provided with slots, such as 33, for engagement by a common screw driver. It will be understood, however, that other means for engaging the screws for rotation, such as Allen recesses or Phillips recesses, may also be provided. A flat extending in the plane parallel to the shank 30 is provided on each of the screws as designated at 35.

A plurality of slots 26 spaced correspondingly to the holes in the trailing edge 12 are provided in the inner leg 21 of the molding 20, as shown. These slots extend from the free edge of the inner leg 21 toward the connecting portion 23, for a distance of approximately one-half of the length of the leg 21.

For installation, the screws 30 are first passed through the holes in the trailing edge 12 from the outer side of the door and suitable nuts, either of conventional type or of spring type as illustrated at 36, are applied to the free ends of the shanks 31 to hold the screws 30 lightly in position without turning. Thereupon, the molding 20 is applied to the edge and slipped thereon in such a manner that the hook flange 24 climbs over the rounded heads 32 of the screws while the shanks 31 pass through the slots 26 as the free edges of the legs 21 pass under the nuts 36.

The position of the screw holes in the trailing edge 12 and the width of the molding 20 itself are so selected that when the rounded portion 23 reaches the extremity of the trailing edge 12, the hook flange 24 snaps into a position of engagement with the flats 35 of the screws 30, as is best shown in Fig. 2. Such engagement not only provides anchoring means for the molding 20 preventing it from sliding off the trailing edge 12 but also prevents rotation of the screws 30. Therefore, after the application of the molding as explained above, the nuts may be tightened to any desirable degree, thus ensuring a secure positive connection of the molding to the door edge. In cases where molding has to be installed on the door of an automobile already on the road, proper location of the screw holes in the trailing edge of the door is determined in the following manner. The molding is first applied on the edge and a line is scribed on the inner side of the door edge, such as on the return flange 16 in the embodiment illustrated. Thereupon, a template made on the basis of the molding used and having a plurality of holes properly positioned is applied to the door edge, and location of the holes is marked through the template. It will be appreciated that instead of flats 35 and hook flange 24 other means affecting engagement of the molding with the screws may be used.

It will now be seen, in view of the foregoing, that by virtue of the above construction the molding is connected to the trailing edge of the door in a positive manner with the aid of screws. The connection is such that the molding itself operates as locking means for the screws, preventing their rotation and loosening. The outer leg 22 of the molding covers the heads 32 of the screws 30 and yet it does not interfere with the installation of the screws 30, as is the case with conventional construction.

Should removal of the molding become necessary, the same may be effected just as easily by loosening of the nuts 36, prying the molding under the hook flange 24 to get said flange on the top of the screw heads. Thereupon, the molding can be easily slipped off the edge.

The heads 32 are completely concealed from view. Since the combined thicknesses of the trailing edge and the inner leg of the molding is definite, the length of the shanks 31 of the screws 30 can be precisely selected to protrude inwardly from the trailing edge only for such a distance as is necessary for engagement by the nuts of a desired type.

Fig. 7 illustrates a modified construction embodying the present invention. Generally, the main difference between the construction of Fig. 7 and that of Figs. 1–6 is found in the fact that the head 42 of the screw employed in the construction of Fig. 7 has no flat provided thereon, while the end of its shank is provided with a straight slot as shown at 43. The edge 45 of the outer leg 44 of the molding also need not be provided with a hook flange although it may be turned upon itself to provide a closed flange in order to eliminate sharp edge. The edge 45 does not engage the head 42 of the screw and does not operate to hold it from rotation. However, the head 42 is modified in such a manner as to enable the user to engage it with some hand tool and thus prevent its rotation. In the embodiment illustrated, the shank is provided with a slot for its engagement by a screw driver. The head 42 is rounded in order to enable the edge 45 of the leg 44 to climb over the head 42.

With this construction, the screws are first inserted into the holes prior to application of the molding, and nuts 46 are applied to their free slitted ends and tightened lightly. Thereupon, the molding is pushed on the trailing edge of the door with the inner leg 47 of the molding going under the nuts 46 and the threaded shank of the screw passing through the slots 48 provided in the leg 47 of the molding similarly to slots 26 of the construction of Figs. 1–6. For tightening the screws in place, a screw driver is applied to the slot 43 provided in the end of the shank of the screw and the nut 46 is tightened with the aid of a small wrench.

The advantage of this construction is found in the fact that no flats need be provided on the screw head, and the screws need not be aligned in any particularly precise manner, except that with the provision of a straight slot in the screw head, it may be desirable to align them roughly in the direction perpendicular to the trailing edge in order to prevent their catching on the edge 45 of the molding. The construction of Figs. 1–6 has an advantage over the construction of Fig. 7 in having the molding itself operate as means to lock the screw from rotation. On the other hand, removal of the molding of Fig. 7 is made easier than that of the molding of Figs. 1–6. There is no need with the construction of Fig. 7 to pry the edge 45 with a screw driver, since said molding may be simply slipped off the edge after the nuts 46 are loosened.

By virtue of the above disclosed construction, objects of the invention listed above and other additional advantages are attained.

I claim:

1. In an automobile body including a door having a trailing edge, an ornamental and protective molding for said edge, said molding comprising a resilient metal strip having a U-shaped cross-sectional configuration and including an outer leg adapted to engage the outer surface of the door, an inner leg adapted to engage the inner surface of the door, a flange provided along the free end of the outer leg to provide a hook thereat, the inner leg being provided with a plurality of through slots extending from approximately the middle of said leg to the free end thereof, a plurality of threaded connectors, each having a shank passed through the trailing edge of the door and protruding in the inward direction and passing through the respective slot in the inner leg, each connector including a head engaging the trailing edge at the outer surface of the door, the hook flange provided on the outer leg of the molding engaging said head to retain the molding in place, and a nut on the end of the shank of the connector adapted to bear on the inner leg of the molding.

2. In an automobile body including a door having a trailing edge, an ornamental and protective molding for said edge, said molding comprising a metal strip having a U-shaped cross-sectional configuration and including an outer leg adapted to engage the outer surface of the door, an inner leg adapted to engage the inner surface of the door, a flange provided along the free end of the outer leg to provide a hook thereat, the inner leg being provided with a plurality of transverse slots extending from approximately the middle of said leg to the free end thereof, a corresponding plurality of threaded connectors, each having a shank passed through the trailing edge of the door and protruding therefrom in the inward direction and passing through the slot in the inner leg and a head engaging the trailing edge at the outer surface of the door, the head of said connector having a flat extending in the installed position of the connector in a plane substantially parallel to the trailing edge of the door, the hook flange provided on the outer leg of the molding engaging said head at said flat to retain the molding in place and to lock the connector from rotating, and a nut engaging the end of the shank of the connector and adapted to bear on the inner leg of the molding.

3. The invention defined in claim 2, the head of said connector having a smoothly rising cam surface adapted to cause the hook of the molding to rise, when the molding is being installed, and to snap into engagement with the flat provided on the head.

References Cited in the file of this patent

UNITED STATES PATENTS

| | | |
|---|---|---|
| 1,043,489 | Webster | Nov. 5, 1912 |
| 1,915,448 | Ruth | June 27, 1933 |
| 2,379,193 | Shields | June 26, 1945 |
| 2,605,871 | Kress | Aug. 5, 1952 |
| 2,624,596 | Clingman | Jan. 6, 1953 |
| 2,831,723 | Adell | Apr. 22, 1958 |
| 2,879,104 | Halladay | Mar. 24, 1959 |